Feb. 27, 1962 A. M. MADSEN, JR Re. 25,130

AUTOMATIC DENTAL COOLING ATTACHMENT

Original Filed April 22, 1955

INVENTOR

Arthur M. Madsen, Jr.

BY Robert M. Dunning

ATTORNEY

United States Patent Office

Re. 25,130
Reissued Feb. 27, 1962

25,130

AUTOMATIC DENTAL COOLING ATTACHMENT

Arthur M. Madsen, Jr., 1704 Saunders Ave., St. Paul, Minn.

Original No. 2,902,762, dated Sept. 8, 1959, Ser. No. 503,296, Apr. 22, 1955. Application for reissue July 29, 1960, Ser. No. 46,324
11 Claims. (Cl. 32—28)

Matter enclosed in heavy brackets [ ] appears in the original patent but forms no part of this reissue specification; matter printed in italics indicates the additions made by reissue.

This invention relates to an improvement in automatic dental coolant attachment and deals particularly with an apparatus useful in directing a stream of water, air or spray against a tooth being drilled.

With the advent of high speed drilling equipment, it has become essential to provide some means of cooling the tooth being drilled as a part of the drilling operation. In certain instances it is preferable to direct a stream of water against the surface being drilled. In other instances a mixture of air and water may be most effectively employed. In other cases a stream of air will provide the necessary cooling action. It is an object of the present invention to provide an apparatus which may easily and selectively employ any of these cooling streams.

Various devices have been employed for accomplishing a somewhat similar purpose. However, in the past the structures employed have had certain definite disadvantages. For examples, most such devices employed a reservoir for the cooling liquid which contained a relatively small quantity of liquid. Because of the small capaicty of the reservoir, it has been necessary to stop the drilling operation and to refill the reservoir at relatively frequent intervals. Furthermore, while the apparatus normally supplied a spray of liquid, it was possible to cut off the liquid so that only air would pass through the system. However, to accomplish this change required a mechanical adjustment in the mixing portion of the apparatus which required some little time to complete and which often required the use of tools.

An object of the present invention lies in the provision of an apparatus connected to a source of water supply under pressure and also connected to a source of air. Both water and air are normally available in most up to date dental offices. Automatically operable valves such as solenoid valves control the flow of both or one of these fluids into a common line. As a result either water, air, or a mixture thereof is instantly available for use.

A feature of the present invention resides in the provision of a switch or dial which may be supported in a conveniently accessible location such as on the under surface of the instrument tray which is supported by suitable bracket arms in a position where it is at all times accessible. This switch is capable of closing any of a series of circuits or in any event connecting any of a series of circuits into condition where they are in readiness for operation. Thus when the dental engine is turned on by operation of the usual foot controlled rheostat, the desired circuit is closed to produce the desired stream.

A feature of the present invention resides in the fact that by changing the position of the readily accessible switch, either solenoid or both solenoids may be energized simultaneously with the dental engine. As a result as soon as the dental engine is turned on, one or both solenoids may be energized to direct a stream of water, a stream of air or a combination of these fluids through a suitable conduit to the dental handpiece. Nozzles are provided which are useful in conjunction with either a straight handpiece or with a contra angle.

A feature of the present invention lies in the fact that the stream of coolant may be quickly changed when desired. For example, if a spray is being employed and it is desired to employ a stream of water, this may be done by merely changing the position of the operating switch without interrupting the stream of fluid flowing through the system.

An added feature of the invention lies in the fact that by the use of my apparatus, increased visibility is possible. This is of utmost importance in the operation of the apparaus. In drilling operations, the moisture added by the spray or by the water stream has a tendency to cause fogging of the mirror used by the dentist to provide proper visibility of the work being done. The ability to switch the stream of fluid at will from a stream of water or a stream of spray to a stream of air is for this reason, of utmost importance. When better visibility of the work is required, the control switch can be operated to quickly cut off the water or spray, and to provide an air stream. This air stream dries up the area being drilled or worked upon, and also acts to dry up the mirror surface. Thus, whenever necessary, a clear unobstructed view of a dry surface is available.

A further feature of the invention lies in this ability of the system to selectively provide an air stream. In the drilling of certain teeth, the view of the surface worked upon is often obscured by the flow of saliva or blood upon the area worked upon. This is particularly true when working on the upper teeth where secretions of the salivary glands tend to drain down the tooth surfaces. Where the gums are punctured during the operation, blood also tends to drain down the teeth. This saliva or blood is finely divided by the dental drill, and spatters on the mirror, and also conceals the surface being treated. A stream of air normally clears up this difficulty and keeps the surface dry and readily visible. This also prevents spattering of the fluid on the mirror.

These and other objects and novel features of my invention will be more clearly and fully set forth in the following specification and claims.

In the drawings forming a part of the specification:

Figure 1:
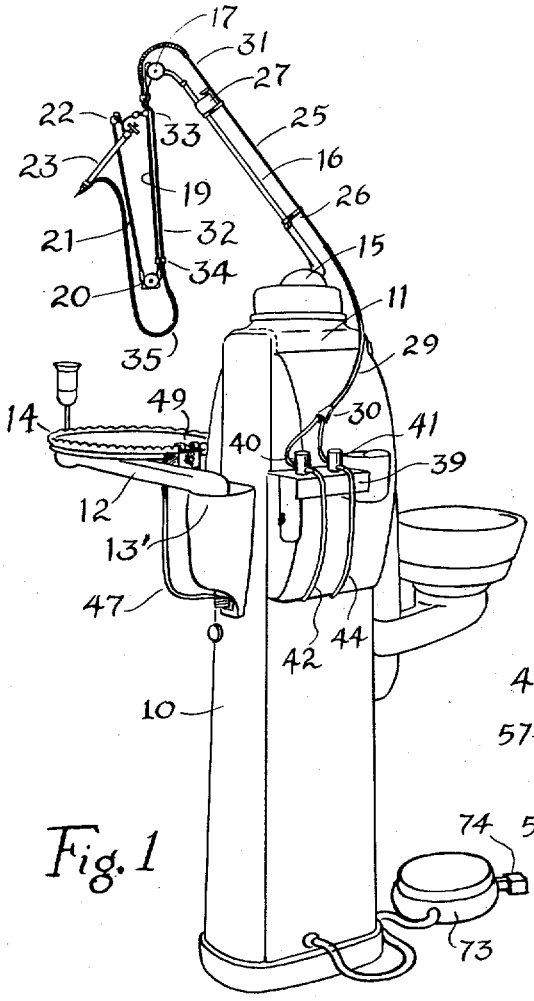
FIGURE 1 is a perspective view of a dental unit indicating the manner in which the apparatus coolant is attached thereto.
Figure 2:
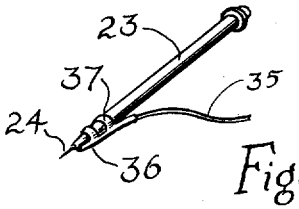
FIGURE 2 is a perspective view indicating the manner in which the attachment may be connected to the straight handpiece.

FIGURE 1 is a perspective view of a dental unit showing the dental engine, the instrument tray and the rheostat used for controlling the dental engine. The unit is of a type which is on the market and includes a standard 10 having the dental engine mounted in a housing 11 at its upper extremity. A bracket arm 12 is supported within a vertical bearing 13 and pivotally supports an instrument tray 14. The instrument tray may thus be supported in a convenient location where the instruments thereon are readily accessible to the dentist. A ball and socket joint 15 is provided at the top of the engine housing 11 and supports the upper engine arm 16. The upper engine arm is connected through a suitable swivel joint 17 to the engine arm 19. The engine arm 19 is connected through a suitable swivel joint 20 to the engine arm 21. This arm 21 is connected through a swivel connection 22 to the dental handpiece 23.

As is usual in such devices, flexible cables form a part of the swivel joints and swivel connections and operate from the dental engine to rotate the shaft of the handpiece 23. This handpiece shaft is provided with suitable chuck means well known in the art to support a drill such as 24. Alternatively, a contra angle may be secured to the end of the handpiece and the contra angle is provided with suitable chuck means to support the drill extending at an angle to the handpiece and contra angle.

An elongated tube 25 is connected to the main engine arm 16 by a pair of clamps 26 and 27. A flexible tube 29 extends from the lower end of the tube 25 to a Y-connection 30. The opposite end or upper end of the tube 25 is connected to a flexible conduit 31 to connect either a tubular conduit 32 secured to the engine arm 19 by brackets or clamps 33 and 34. A flexible tube 35 is connected to the end of the tube 32 and leads to the handpiece 23, the tube 35 being usually loosely supported. The tube 35 connects either a nozzle portion 36 which is connected to the handpiece 23 by a spring clip 37, or other suitable means. The nozzle 36 and its spring clip may be shaped to fit the straight handpiece or may be arranged to fit the contra angle so as to direct a stream of fluid against the shank of the drill 24 or closely adjacent to the point of the drill. A bracket 39 is mounted upon the rear of the standard 10 of the dental unit and is designed to support a pair of solenoid valves 40 and 41. A tubular connection 42 leads from a source of water pressure of the valve 40. The opposite side of the valve 40 is connected by a connector 43 to the Y-connection 30. A conduit 44 extends to the solenoid valve 41 from a suitable source of air supply. The air is normally under pressure so as to flow through the connection 44 when the valve 41 is open. A connection 45 leads from the valve 41 to the Y-connection 30.

From the foregoing description it should be evident that when the valve 40 is energized and opened, the water under pressure will flow from the pressure source through the conduit 42, the valve 40, connection 43, Y-connection 30 and through the various connected tubular connections 29, 25, 31, 32 and 35 to the nozzle 36. It should also be evident that when the valve 40 is closed and the valve 41 is opened, air will flow from the source of air under pressure through the tube 44, the valve 41, the connector 45 and the Y-connection 30 through the various tubular members mentioned to the nozzle 36. It should also be apparent that when both the valves 40 and 41 are open, both air and water will flow to the nozzle 36 forming a spray. In other words, in this position the water is forced by the compressed air in a finely divided form to create a spray against the surface being drilled.

Figure 3:
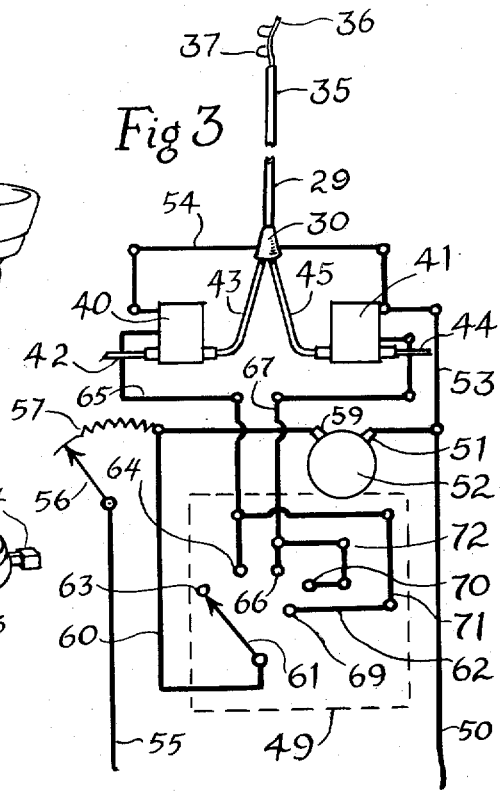
FIGURE 3 is a diagrammatical view showing the system and in general the manner of operation thereof.
Figure 4:
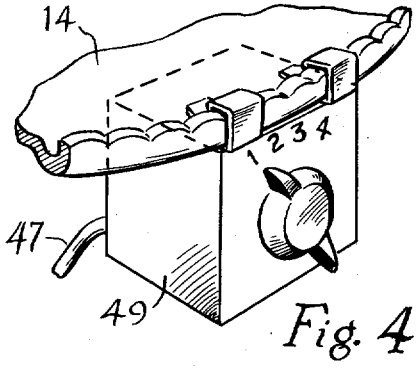
FIGURE 4 is a perspective view of the type of switch which may be used with the apparatus.

In FIGURE 1 of the drawings I diagrammatically disclose a conductor 47 leading from the inside of the unit to a switch casing 49 mounted by suitable means to the under surface of the instrument tray 14. This switch housing 49 is also diagrammatically illustrated in FIGURE 3 of the drawings. This figure shows one manner of controlling the dental engine and the coolant attachment, the particular arrangement illustrated being only for the purpose of illustration. FIGURE 3 shows a line wire 50 extending from a current supply line to one terminal 51 of the dental engine 52. A conductor 50 is also connected by conductor 53 to one terminal of the solenoid valve 41 and by the conductor 54 to one terminal of the solenoid valve 40.

A second line wire 55 is shown connected to the rheostat arm 56 which acts in conjunction with the resistance 57 to supply a variable current to the second terminal 59 of the dental engine 52. Obviously any other type of variable speed control may also be employed.

The resistance 57 is also connected by a conductor 60 to the switch arm 61 of the rotatable switch 62 in the housing 49. In the particular position illustrated the switch arm is in contact with a disconnected terminal 63 so that the attachment is unoperative. A second switch terminal 64 is connected by a conductor 65 to the second terminal of the solenoid valve 40. A third switch terminal 66 is connected by a conductor 67 to the second terminal of the solenoid valve 41. A pair of contact terminals 69 and 70 are simultaneously engageable with the switch arm 61 in a fourth position. The terminal 69 is connected by conductor 71 and the conductor 65 to the second terminal of the solenoid valve 40. The terminal 70 is connected by the conductors 72 and 67 to the second terminal of the solenoid valve 41.

In the particular arrangement illustrated, the rheostat arm 56 is enclosed within the dental engine controlling unit 73 and the arm 56 is moved by rotation of either of the pedal arms 74. When not rotated, the switch arm 56 is in a circuit opening position.

If a stream of water is desired at the nozzle of the drill, the switch arm 61 is turned to its second position described where the arm 61 is in contact with the terminal 64. Neither solenoid will be operated as the operating circuit extends through the dental engine controller 73. However, as soon as the arm 56 of the engine controller is swung into position to start the dental engine, a circuit is closed to the solenoid 41 opening this valve and allowing water under pressure to flow from its source of supply through the valve and Y-connection 30 to the nozzle. The circuit extends from the line wire 50 through conductors 53 and 54 to one of the solenoid valve terminals of the valve 40. The circuit is completed from the other line wire 55 through the arm 56, the resistance 57, the conductor 60, the switch arm 61, terminal 64 and conductor 65 to the other solenoid terminal.

If a blast of air is desired from the nozzle 36, the switch arm 61 is turned to its third position in contact with the terminal 66. This may be done either while the dental engine is in operation or when it is off. When the switch arm 61 is in this third position and the dental engine is in operation, a circuit is closed through the valve 41, permitting air to blow from the source of supply through the conductor 44, the valve 41, connector 45 and Y-connector 30 through the various connected tubular members to the nozzle 36. This circuit extends from line wire 50 through the conductor 53 to the solenoid 41. The circuit is completed from the other line wire 55 through the arm 56, resistance 57, conductor 60, switch arm 61, terminal 66, and conductor 67 to the second solenoid terminal.

When it is desired to provide a spray or mixture of air and water, the switch arm 61 is turned to the fourth position or into contact with the terminals 69 and 70. In this case both of the solenoids 40 and 41 are simultaneously energized and both air and water are directed through the Y-connection 30 to the nozzle 36. The circuits opening both solenoids extend from the line wire 50 through conductor 53 to one terminal of the solenoid 41 and through conductor 54 to one terminal of the solenoid 40. The circuits are completed from the line wire 55, arm 56, resistance 57, conductor 60, switch arm 41, terminal 69 and conductors 71 and 65 to the second terminal of the solenoid 40 and through terminal 70 and conductors 72 and 67 to the second terminal of the solenoid valve 41.

Thus I have provided a means of supplying a stream of water, a stream of air, or a spray stream from suitable pressure sources to the nozzle attached to the dental handpiece. The type of stream may be varied at any time whether the dental engine is in operation or not by merely turning the switch arm 61 to the desired position. Therefore, if a stream of water has been employed, and it is desired to dry the surface being drilled, the switch arm may be turned to the proper position to stop the water supply and to provide merely air. In the same way the surface may be washed with a stream of water whenever desired by merely operating the controlling switch. At any time a coolant stream of the desired type may be provided and the stream stops immediately with the dental engine.

In accordance with the patent statutes, I have described the principles of construction and operation of my automatic dental coolant attachment, and while I have endeavored to set forth the best embodiment thereof, I desire to have it understood that obvious changes may be made within the scope of the following claims without departing from the spirit of my invention.

I claim:

1. In combination, a dental unit, a dental engine supported by said unit, a dental engine control connected to said dental engine, a circuit including a source of current supply connecting said control and said engine for operating said engine through said control, a pressure source of liquid supply, a first solenoid valve connected to said liquid source to control the flow therefrom, a pressure source of air, a second solenoid valve connected to said pressure source to control the flow therefrom, a common conduit connected to both of said solenoid valves for receiving fluid from either of said sources, a nozzle connected to said conduit, and a selector switch including a first fixed contact having electrical connection with the solenoid of said first solenoid valve, a second fixed contact having electrical connection with the solenoid of said second solenoid valve, a pair of fixed contacts having electrical connection with both of said solenoids, and a rotatable contact arm having an off position, said arm being movable from said off position into engagement with said first contact to actuate said first solenoid into engagement with said second contact to actuate said second solenoid or into common contact with said pair of contacts to actuate both of said solenoids simultaneously.

2. The construction described in claim 1 and in which said unit includes dental engine arms, a handpiece supported by said arms, and means connecting said handpiece and said dental engine for operating the same in unison, and means on said common conduit selectively connecting said nozzle to said handpiece.

3. In combination, a dental unit including a dental engine, a handpiece connected to said dental engine and operable thereby, a instrument tray, means connecting said instrument tray to said unit, a control for controlling said dental unit, and a circuit including said control, said dental engine and a source of current supply for operating said engine by means of said control, a pressure source of liquid, a pressure source of air, an electrically operable valve connected to each said source to control the flow of fluid therefrom, a common tubular connector connected to said valves to receive fluid from either of said sources, a circuit including a current supply source connected to said electrically operated valves and switch means in said last named circuit having first, second and third position for controlling the operation of either or both of said electrically operated valves, said last named circuit also including said dental engine control so that said second circuit will function simultaneously with said dental engine.

4. The construction described in claim 3 and including means supporting said switch to said instrument tray.

5. The construction described in claim 3 and in which said common conduit includes a nozzle, and including means for connecting said nozzle to said dental handpiece.

*6. In combination, a dental unit, a dental engine supported by said unit, a dental engine control connected to said dental engine, a circuit including a source of current supply connecting said control and said engine for operating said engine through said control, a pressure source of liquid supply, a first solenoid valve connected to said liquid source to control the flow therefrom, a pressure source of air, a second solenoid valve connected to said pressure source to control the flow therefrom, a dental handpiece, nozzle means carried by said dental handpiece directing air or water or both toward a drill driven by said handpiece, and conduits from said water and air solenoid valves to said nozzle means, and a selector switch including a first fixed contact having electrical connection with the solenoid of said first solenoid valve, a second fixed contact having electrical connection with the solenoid of said second solenoid valve, a pair of fixed contacts having electrical connection with both of said solenoids, and a rotatable contact arm having an off position, said arm being movable from said off position into engagement with said first contact to actuate said first solenoid, into engagement with said second contact to actuate said second solenoid or into common contact with said pair of contacts to actuate both of said solenoids simultaneously.*

*7. The construction described in claim 6 and in which the said unit includes dental engine arms, the said arms supporting said handpiece, and means connecting said handpiece and said dental engine for operating the same in unison, and means for controlling said dental engine and simultaneously turning one or both of said solenoids on or off.*

*8. In combination, a dental unit including a dental engine, a handpiece connected to said dental engine and operable thereby, an instrument tray, means connecting said instrument tray to said unit, a control for controlling said dental unit, and a circuit including said control, said dental engine and a source of current supply for operating said engine by means of said control, a pressure source of liquid, a pressure source of air, an electrically operable valve connected to each said source to control the flow of fluid therefrom, nozzle means connected to said valves to receive fluid from either of said sources, a circuit including a current supply source connected to said electrically operated valves and switch means in said last named circuit having first, second and third position for controlling the operation of either or both of said electrically operated valves, said last named circuit also including said dental engine control so that said second circuit will function simultaneously with said dental engine.*

*9. An automatic coolant assembly for dental handpieces, comprising a dental handpiece having a rotatable shaft supporting a dental tool, nozzle means carried by the handpiece for directing water and air toward the dental tool, a source of air under pressure, a source of water under pressure, a conduit extending from each of said sources of air and water to a solenoid valve in each case, a conduit from each solenoid valve to said nozzle means, a source of electric current for energizing said solenoids, electric switch means and circuits connecting said switch means between said source of current and said solenoids, said switch means having a position in which the assembly effects the flow of water only from said nozzle means, a second position in which said assembly effects the flow of air from said nozzle means, and a third position in which the assembly effects the flow of both air and water from said nozzle means.*

*10. A coolant assembly according to claim 9, including electrically controlled driving means for the handpiece tool and energizing electric circuits including said driving means and switch means whereby the coolant water or air or both are automatically turned on when the driving means is turned on.*

*11. An automatic coolant assembly for dental handpieces, comprising a dental handpiece having a rotatable shaft for supporting a dental tool, driving means for said handpiece shaft comprising an electric motor and flexible cables extending from said electric motor to the handpiece to rotate the handpiece shaft nozzle means carried by the handpiece for directing water and air toward the dental tool, said nozzle means being provided with clamping means for removably attaching the nozzle means to the handpiece, a source of air under pressure, a source of water under pressure, a conduit extending from each of said sources of air and water to a solenoid valve in each case, a conduit from each solenoid valve to said nozzle means, a source of electric current for energizing said solenoids, electric switch means and circuits connecting said switch means between said source of current and said solenoids, means for supporting said electric switch*

*means upon an instrument tray carried by a dental unit standard, said electric switch means being provided with a movable switch arm having an open circuit position and four additional closed circuit positions, said switch means having a position in which the circuit to the water solenoid valve is closed and the assembly effects the flow of water only from said nozzle means, said switch means having a second position in which the circuit to the air solenoid valve is closed and said assembly effects the flow of air only from said nozzle means, said switch means having a third position in which the circuit is closed through both the air and water solenoids and the assembly effects the flow of both air and water from said nozzle means, said switch means also including a rheostat controlling the stopping, starting, and speed of said electric motor, whereby the dental handpiece may be supplied at said nozzle*

*means with air, water, or a mixture of air and water while said dental handpiece shaft is rotating the dental tool or while the tool is not rotating.*

References Cited in the file of this patent or the original patent

UNITED STATES PATENTS

| | | |
|---|---|---|
| 1,000,785 | Cunningham et al. | Aug. 15, 1911 |
| 1,648,273 | Hofschneider | Nov. 8, 1927 |
| 2,098,732 | Prather | Nov. 9, 1937 |
| 2,532,054 | Broussard et al. | Nov. 28, 1950 |
| 2,557,377 | Ganz | June 19, 1951 |

FOREIGN PATENTS

| | | |
|---|---|---|
| 696,626 | Great Britain | Sept. 2, 1953 |